(No Model.)

W. A. SHAW.
ELECTRIC CABLE.

No. 305,854. Patented Sept. 30, 1884.

WITNESSES:
Darwin S. Wolcott
C. M. Clarke

INVENTOR.
William A. Shaw,
BY George H. Christy
his ATTORNEY.

UNITED STATES PATENT OFFICE.

WILLIAM ANTHONY SHAW, OF PITTSBURG, PENNSYLVANIA.

ELECTRIC CABLE.

SPECIFICATION forming part of Letters Patent No. 305,854, dated September 30, 1884.

Application filed June 6, 1884. (No model.)

*To all whom it may concern:*

Be it known that I, WILLIAM ANTHONY SHAW, a citizen of the United States, residing at Pittsburg, in the county of Allegheny and State of Pennsylvania, have invented or discovered certain new and useful Improvements in Electric Cables, of which improvements the following is a specification.

Figure 1:
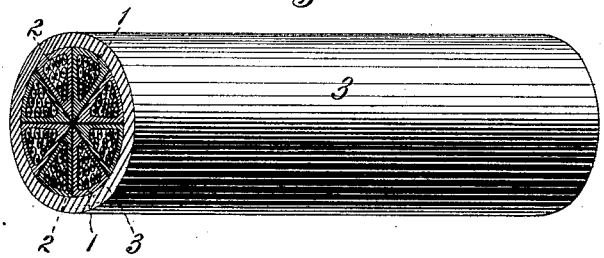
Figure 2:
Figure 3:
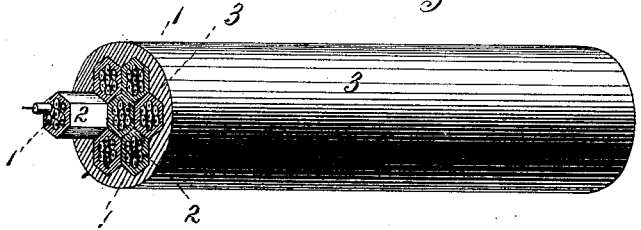

In the accompanying drawings, which make part of this specification, Figure 1 is a perspective view of a section of cable, showing the manner of uniting lead-covered groups of wires in a lead pipe or sheath. Fig. 2 is a perspective view of a section of one of the groups. Fig. 3 is a perspective of a section of cable, showing a modification in the shape of the groups.

My invention relates to that class of electric cables in which a series of electric conductors are embedded in a body of insulating material, which in turn is inclosed in a metal pipe or covering. In making this class of cables, a series of insulated wires are drawn through lengths or sections of pipe, which is then filled with insulating material; but these wires, when small in section, are liable to be broken in drawing them into the pipe, or the insulating material is rubbed off, and adjacent wires will then have metallic contact with each other and thus destroy their efficiency. These cables as now constructed are objectionable, for the reason that loops or branches or joints cannot be formed on any one of the wires without disturbing the other wires within the metallic pipe or sheathing.

The object of my invention is to so construct a cable of this class of cables that the wires can be easily drawn within the metallic pipe without endangering either the integrity of the insulation or of the wires themselves, and the wires are so arranged within the pipe that access can readily be had to any one or more for the purpose of forming loops, branches, or joints without disturbing all the other wires; and to this end my invention consists in the construction and combination of parts, all as more fully hereinafter described and claimed.

In making my improved cable, I group together a series of insulated wires, 1, in any desired shape or configuration, but preferably arranging them in polygonal groups, as shown, for convenience in packing a number of such groups together. The wires composing each group are then inclosed within a thin sheath of lead, 2, which can be done in any desired manner, but most conveniently by passing the wires through a lead-press, the die of which is so constructed as to cause the leaden sheath to conform to the shape or form in which the wires have been grouped. The groups thus prepared are then inclosed within a metallic pipe or covering, 3. This inclosure may be effected in several ways—as, for instance, a drawing cord or wire may be passed through the pipe, and by attaching one end of this cord to the groups to be inclosed they can be drawn into the pipe without any danger of breaking the wires or abrading or stripping the insulation around each; or, if desired, the groups may be arranged together, and the metallic pipe 3 may be formed around them in a lead press in the same manner as the sheath is formed in the individual groups. When the groups are given a hexagonal form, the inner surface of the pipe 3 may be made to conform with the perimeter of a number of groups arranged together, as seen in Fig. 3; or the outer sides of the outer hexagonal groups may be rounded, so as to conform with the inner circular perimeter of an ordinary pipe. The outer surface of the pipe 3 may be marked in any desired manner, so as to indicate the location of the groups within the pipe, and each group may be given some distinctive mark or color, as may also each wire of a group, for the purpose of identification when splices or loops are to be formed.

I claim herein as my invention—

1. In a lead-covered cable, the combination of two or more groups of wires, each group consisting of two or more insulated wires inclosed within a leaden sheath, and a metallic protecting pipe or covering inclosing said groups, substantially as set forth.

2. In a lead-covered cable, the combination of two or more groups of wires, each group consisting of two or more insulated wires inclosed within a polygonal leaden sheath, and a metallic pipe or covering inclosing said groups, substantially as set forth.

In testimony whereof I have hereunto set my hand.

WILLIAM ANTHONY SHAW.

Witnesses:
DARWIN S. WOLCOTT,
R. H. WHITTLESEY.